(12) United States Patent
Kordahi et al.

(10) Patent No.: US 6,778,743 B1
(45) Date of Patent: Aug. 17, 2004

(54) CABLE TERMINATION ARRANGEMENT

(75) Inventors: Maurice Kordahi, Atlantic Highlands, NJ (US); David Giordano, Barnegat, NJ (US); Tek-Che Chu, Morganville, NJ (US); Tony S. Fong, Manalapan, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 132 days.

(21) Appl. No.: 09/718,705

(22) Filed: Nov. 22, 2000

(51) Int. Cl.⁷ .................................................. G02B 6/44
(52) U.S. Cl. ...................................................... 385/107
(58) Field of Search ............................. 385/81, 86, 87, 385/107

(56) References Cited

U.S. PATENT DOCUMENTS

| | | | |
|---|---|---|---|
| 4,123,133 A | 10/1978 | Pickett et al. | 399/273 |
| 4,336,977 A * | 6/1982 | Monaghan et al. | 350/96.2 |
| 4,507,008 A | 3/1985 | Adl et al. | 403/275 |
| 4,773,729 A | 9/1988 | Mignien | 350/96.21 |
| 4,846,564 A | 7/1989 | Caron et al. | 350/96.2 |
| 5,000,536 A | 3/1991 | Anderson et al. | 350/96.2 |
| 5,018,251 A | 5/1991 | Brown | 24/122.6 |
| 5,222,169 A * | 6/1993 | Chang et al. | 385/87 |
| 5,266,742 A | 11/1993 | Heier et al. | 174/93 |
| 5,539,960 A | 7/1996 | Vanasse et al. | 24/122.6 |
| 6,061,879 A | 5/2000 | Ericson et al. | 24/304 |
| 6,256,446 B1 * | 7/2001 | Brunsting et al. | 385/140 |

FOREIGN PATENT DOCUMENTS

| | | |
|---|---|---|
| DE | 3820950 | 12/1989 |
| EP | 0 235 891 | 1/1987 |
| EP | 0368639 | 5/1990 |
| WO | WO 9424598 | 10/1994 |

* cited by examiner

Primary Examiner—Javaid H. Nasri

(57) ABSTRACT

A cable termination arrangement is used to terminate cables, such as armored fiber optic cables, to a connecting structure, such as a cable joint or coupling. Strength members, such as aramid rods, extending along the cable are terminated with radial termination members, such as crimping ferrules. The radial termination members extend into a termination cavity within the connecting structure and are spaced substantially equally, for example, using separators. An epoxy or other suitable retaining material encases the radial termination members, strength members, and separators.

17 Claims, 3 Drawing Sheets

CABLE TERMINATION ARRANGEMENT

TECHNICAL FIELD

The present invention relates to cable terminations and more particularly, relates to a cable termination arrangement for terminating strength members in a fiber optic cable.

BACKGROUND INFORMATION

Armored fiber optic cables often include one or more layers of strength members along the length of the cable to provide tensile strength and prevent damage to the cable. One type of undersea fiber optic cable, for example, includes layers of aramid rods having a high tensile strength to provide a high level of protection. When these cables are connected to structures, such as couplings and joints, the strength members are typically terminated or secured to the structure using a cable termination arrangement. Existing cable termination arrangements are often not strong enough to withstand the high loads applied to the strength members.

One standard termination for strength members, such as aramid rods, uses only epoxy to secure the aramid rods within the coupling or joint. However, the low coefficient of friction between the aramid rods and the epoxy often results in slippage between the aramid rods and the epoxy. As a result, the aramid rod termination must be longer to prevent slippage in this standard termination using only epoxy.

Accordingly, there is a need for a cable termination arrangement for strength members, such as aramid rods, that reduces the overall length of the termination and provides a stronger termination.

SUMMARY OF THE INVENTION

One aspect of the present invention is an armored cable comprising a cable, a plurality of strength members extending along and surrounding the cable, and at least one crimping ferrule crimped onto an end of each of the strength members. Each crimping ferrule preferably has a length such that the crimping ferrule has a radial crimp termination strength in the range of the tensile strength of the strength members. In one embodiment, the cable is a fiber optic cable and the strength members are aramid rods.

Another aspect of the present invention is a cable termination arrangement for terminating a cable to a connecting structure. The cable termination arrangement comprises a plurality of strength members extending along and surrounding the cable and a radial termination member terminating an end of each of the strength members. The radial termination members are located in a termination cavity within a load bearing housing. A retaining material is disposed within the termination cavity and surrounds the radial termination members.

The radial termination members are preferably substantially equally spaced within the termination cavity. At least one separator is preferably positioned within the termination cavity for receiving and separating at least some of the radial termination members. In one embodiment, an inner separator and an outer separator are positioned within the termination cavity. The inner separator receives and separates a first group of the radial termination members, and the outer separator receives and separates a second group of the radial termination members.

In one embodiment, the radial termination members are preferably crimping ferrules, the strength members are aramid rods, and the retaining material epoxy. The coefficient of friction between each of the aramid rods and the epoxy is less than the coefficient of friction between each of the aramid rods and each of the crimping ferrules.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
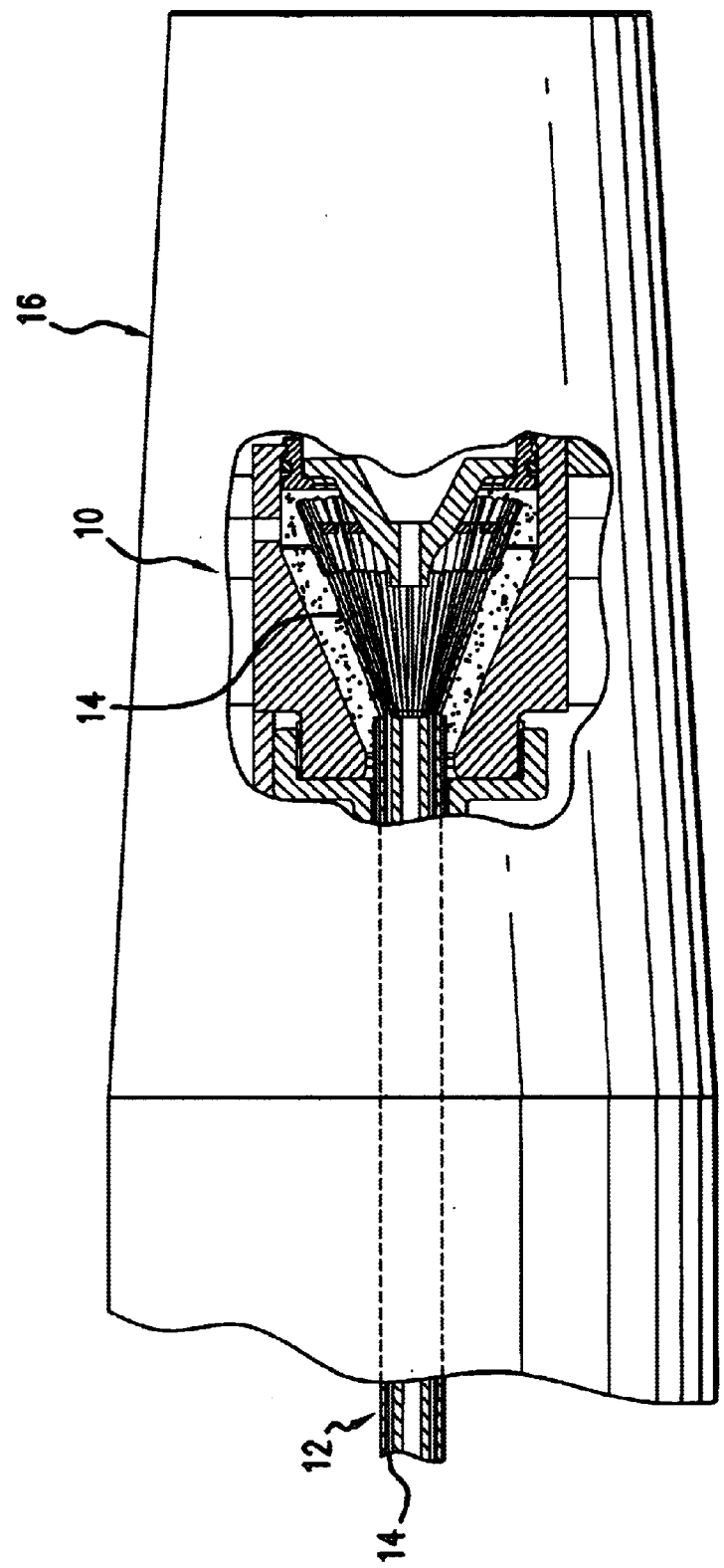
FIG. 1 is a partially cross-sectional view of a coupling having a cable termination arrangement, according to one embodiment of the present invention.
Figure 4:
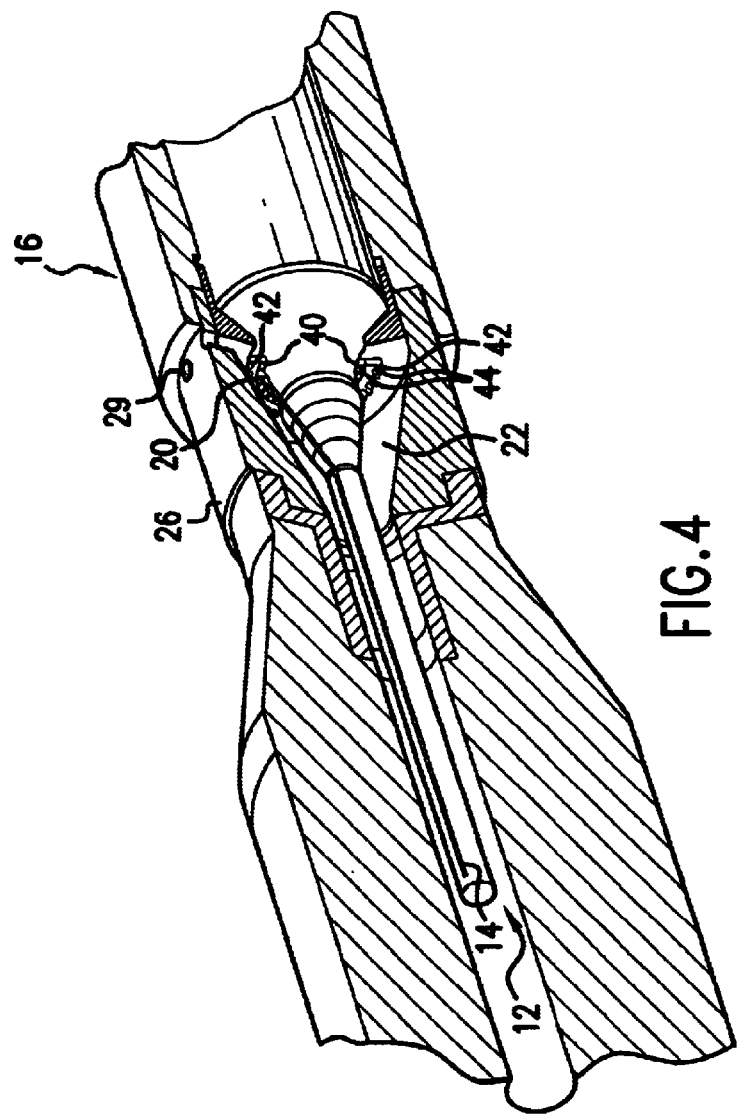
FIG. 4 is a partially cross-sectional view of a cable joint having the separators used in the cable termination arrangement, according to one embodiment of the present invention.

A cable termination arrangement 10, FIG. 1, according to the present invention, is used to terminate an armored cable 12 to a structure 16. The armored cable 12 includes a cable core 13 and strength members 14 extending along and surrounding the cable core 13. According to the exemplary embodiment, the armored cable 12 is a fiber optic cable having aramid rods as strength members 14 and the structure 16 is a coupling (FIG. 1) or a cable joint (FIG. 4). In this exemplary embodiment, the cable core 13 includes a plurality of inner optical fibers 15 and at least one sleeve 17 around the optical fibers 15. The concepts of the present invention can also be used to terminate other types of cables to other types of structures. Although the exemplary embodiment uses aramid rods as strength members, the present invention can also be used to terminate other types of strength members.

Figure 2:
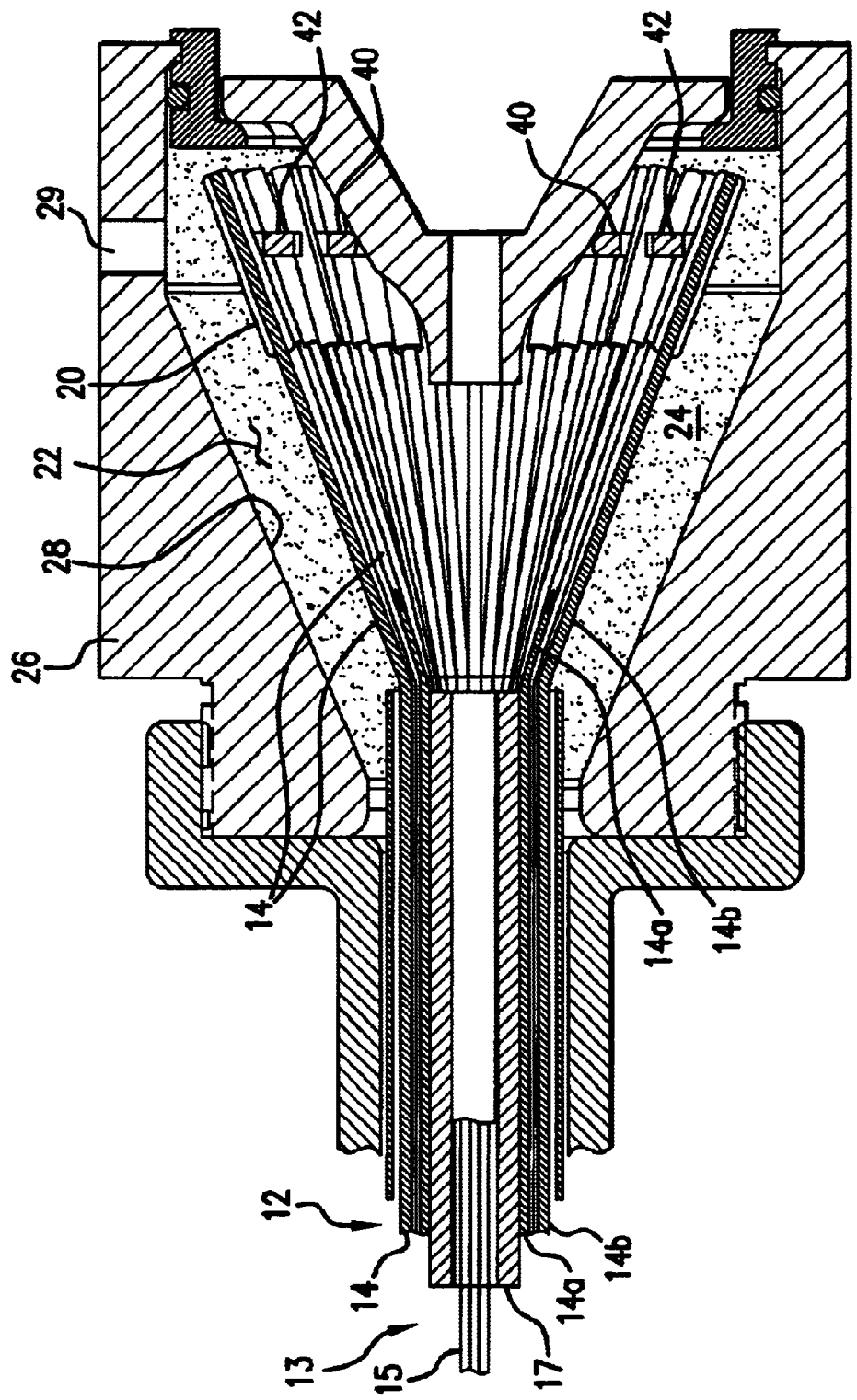
FIG. 2 is a close-up, cross-sectional view of the cable termination arrangement shown in FIG. 1.

Referring to FIG. 2, each of the strength members 14 is terminated with a radial termination member 20. The radial termination members 20 are located in a termination cavity 22 formed by a load bearing housing 26. An epoxy 24 or other suitable retaining material surrounds the radial termination members 20 within the termination cavity 22 to hold the radial termination members 20 into position. The epoxy 24 is preferably a high strength, low shrinkage epoxy. The epoxy 24 transfers the tensile load from the strength members 14 and the radial termination members 20 to the load bearing housing 26. The load bearing housing 26 preferably has a tapered surface 28 defining the termination cavity 22 and the strength members 14 are preferably fanned within the termination cavity 22. The load bearing housing 26 also includes one or more holes 29 for injecting the epoxy 24.

Figure 3:
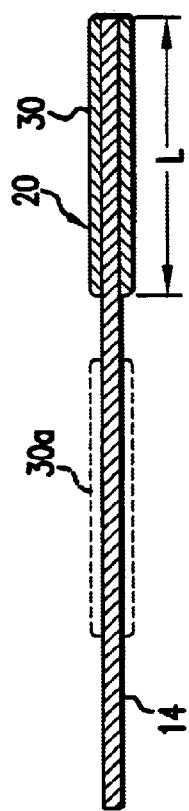
FIG. 3 is a cross-sectional view of a strength member having at least one crimping ferrule used in the cable termination arrangement shown in FIG. 2.

According to one preferred embodiment, the radial termination member 20, FIG. 3, is a crimping ferrule 30 crimped onto an end of the strength member 14. Each of the strength members 14 is preferably individually crimped and substantially equally spaced in order to provide even load sharing amongst all of the strength members 14. The crimping ferrule 30 is preferably made of malleable steel or other compliant metals. The outside diameter of the crimping ferrule 30 is generally sized to fit the diameter of the strength member 14 and in one example, is about ¼ in. The crimping ferrule 30 is preferably capable of holding the aramid rod strength member 14 without slippage and without reducing its tensile strength. The crimping ferrule 30 thus has a length L that provides a radial crimp termination strength in the same range as the tensile strength of the aramid rod strength members 14.

The governing equation for the radial crimp termination strength $F_R$ is as follows:

$$F_R = \int_0^{L_C} \mu P(2\pi R) \cdot \delta L + \int_{L_C}^{L} 0 = K \times L_C \quad (1)$$

where $\mu$ is the coefficient of friction, P is the pressure induced by the crimping ferrule 30, R is the aramid rod diameter, K is the force per unit length gripping coefficient and $L_c$ is the critical crimping length. In the exemplary embodiment, the force per unit length coefficient K has been found to be about 200 N/mm. To achieve strength in the range of the tensile strength of the aramid rod (e.g., about 5,600 N), the minimum or critical crimping length, $L_c$, is about 28 mm.

The coefficient of friction between the aramid rod strength member 14 and the crimping ferrule 30 is preferably greater than the coefficient of friction between the aramid rod strength member 14 and the epoxy 24. Thus, the use of the crimping ferrule 30 reduces the overall length of the termination and provides a stronger termination than the standard epoxy only termination. Additional crimping ferrules 30a (shown in phantom) can also be crimped onto a single strength member 14.

According to one preferred embodiment, inner and outer separators 40, 42, FIG. 4, are positioned within the termination cavity 22 to provide the substantially equal spacing between the radial termination members 20 and the strength members 14. Each of the separators 40, 42 is preferably shaped as a ring having a plurality of notches 44 for receiving the radial termination members 20. The inner and outer separators 40, 42 are encased in epoxy with the radial termination members 20 and the strength members 14. In one embodiment, the cable 12 (FIG. 2) includes at least two layers of strength members 14a, 14b. The radial termination members 20 on the inner layer of strength members 14a are spaced using the inner separator 40 and the radial termination members 20 on the outer layer of strength members 14b are spaced using the outer separator 42. For purposes of clarity, only one strength member 14 and radial termination member 20 is shown in FIG. 4.

According to one method of termination, each strength member 14 is fitted with one or more crimping ferrules 30. The crimping ferrule(s) 30 on each strength member 14 is reduced in size to grip the strength member 14 using a hand or power crimping tool. The crimping ferrules 30 on each of the strength members 14 are then set in the separators 40, 42. Once all of the crimping ferrules 30 are positioned and the housing 26 is positioned over the strength members 14 and the crimping ferrules 30, the epoxy 24 is injected through the holes 29 in the load bearing housing 26 to surround the strength members 14 and crimping ferrules 30.

Accordingly, the cable termination arrangement of the present invention is capable of terminating strength members, such as aramid rods, with improved strength.

Modifications and substitutions by one of ordinary skill in the art are considered to be within the scope of the present invention, which is not to be limited except by the claims which follow.

What is claimed is:

1. An armored cable comprising:
   a cable core;
   a plurality of strength members extending along said cable core and surrounding said cable core; and
   a plurality of crimping ferrules crimped onto each of said strength members.

2. The armored cable of claim 1 wherein each of said crimping ferrules extends a length L such that each of said crimping ferrules has a radial crimp termination strength within a range of the tensile strength of a respective one of said strength members.

3. The armored cable of claim 1 wherein said crimping ferrule has a length L of at least about 28 mm.

4. The armored cable of claim 1 wherein said cable core includes a plurality of inner optical fibers and at least one sleeve around said optical fibers.

5. The armored cable of claim 1 wherein said strength members are aramid rods.

6. A cable termination arrangement for terminating a cable to a connecting structure, said cable termination arrangement comprising:
   a cable core;
   a load bearing housing having a termination cavity;
   a plurality of strength members extending along said cable core and surrounding said cable core;
   at least one radial termination member terminating an end of each of said strength members, wherein said radial termination members are located in said termination cavity within said load bearing housing;
   a retaining material disposed within said termination cavity and surrounding said radial termination members;
   an inner separator and an outer separator positioned within said termination cavity, wherein said inner separator receives and separates a first group of said radial termination members and wherein said outer separator receives and separates a second group of said radial termination members; and
   wherein said strength members include at least an inner layer of strength members and an outer layer of strength members, and wherein said first group of radial termination members terminate said inner layer of strength members and said second group of radial termination members terminate said outer layer of strength members.

7. A cable termination arrangement for terminating a cable to a connecting structure, said cable termination arrangement comprising:
   a cable core;
   a load bearing housing having a termination cavity;
   a plurality of strength members extending along said cable core and surrounding said cable core;
   at least one radial termination member terminating an end of each of said strength members, wherein said radial termination members are located in said termination cavity within said load bearing housing;
   a retaining material disposed within said termination cavity and surrounding said radial termination members; and
   at least one separator positioned within said termination cavity for receiving and separating at least some of said radial termination members.

8. The cable termination arrangement of claim 7 wherein said radial termination members are substantially equally spaced within said termination cavity.

9. A cable termination arrangement for terminating a cable to a connecting structure, said cable termination arrangement comprising:
  a cable core;
  a load bearing housing having a termination cavity;
  a plurality of strength members extending along said cable core and surrounding said cable core;
  at least one radial termination member terminating an end of each of said strength members, wherein said radial termination members are located in said termination cavity within said load bearing housing;
  a retaining material disposed within said termination cavity and surrounding said radial termination members;
  wherein said radial termination members are crimping ferrules; and
  wherein the coefficient of friction between each of said strength members and said retaining material is less than the coefficient of friction between each of said strength members and each of said crimping ferrules.

10. A cable termination arrangement for terminating a cable to a connecting structure, said cable termination arrangement comprising:
  a cable core;
  a load bearing housing having a termination cavity;
  a plurality of strength members extending along said cable core and surrounding said cable core;
  at least one radial termination member terminating an end of each of said strength members, wherein said radial termination members are located in said termination cavity within said load bearing housing;
  a retaining material disposed within said termination cavity and surrounding said radial termination members; and
  an inner separator and an outer separator positioned within said termination cavity, wherein said inner separator receives and separates a first group of said radial termination members and wherein said outer separator receives and separates a second group of said radial termination members.

11. The cable termination arrangement of claim 10 wherein said radial termination members are crimping ferrules.

12. The cable termination arrangement of claim 7 wherein said strength members are aramid rods.

13. The cable termination arrangement of claim 7 wherein said retaining material is an epoxy.

14. The cable termination arrangement of claim 9 wherein the coefficient of friction between each of said aramid rods and said epoxy is less than the coefficient of friction between each of said aramid rods and each of said crimping ferrules.

15. The cable termination arrangement of claim 11 wherein said strength members are aramid rods.

16. The cable termination arrangement of claim 15 wherein said retaining material is an epoxy.

17. The cable termination arrangement of claim 16 wherein said crimping ferrules have a length of at least 28 mm.

* * * * *